Aug. 6, 1935.  G. P. HEPPES  2,010,017
MEANS FOR COOLING COMPOSITION TILE
Original Filed July 5, 1932  4 Sheets-Sheet 2
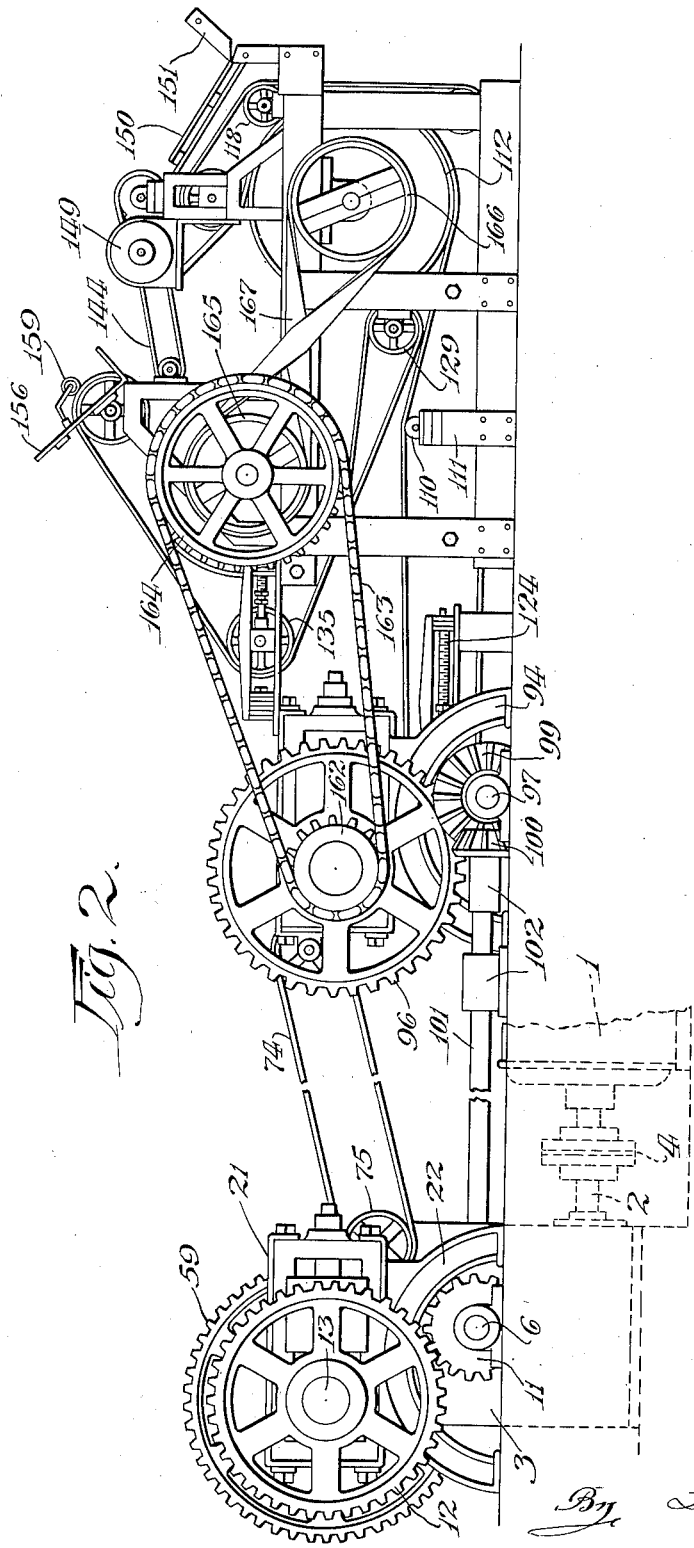
Inventor:
George P. Heppes.

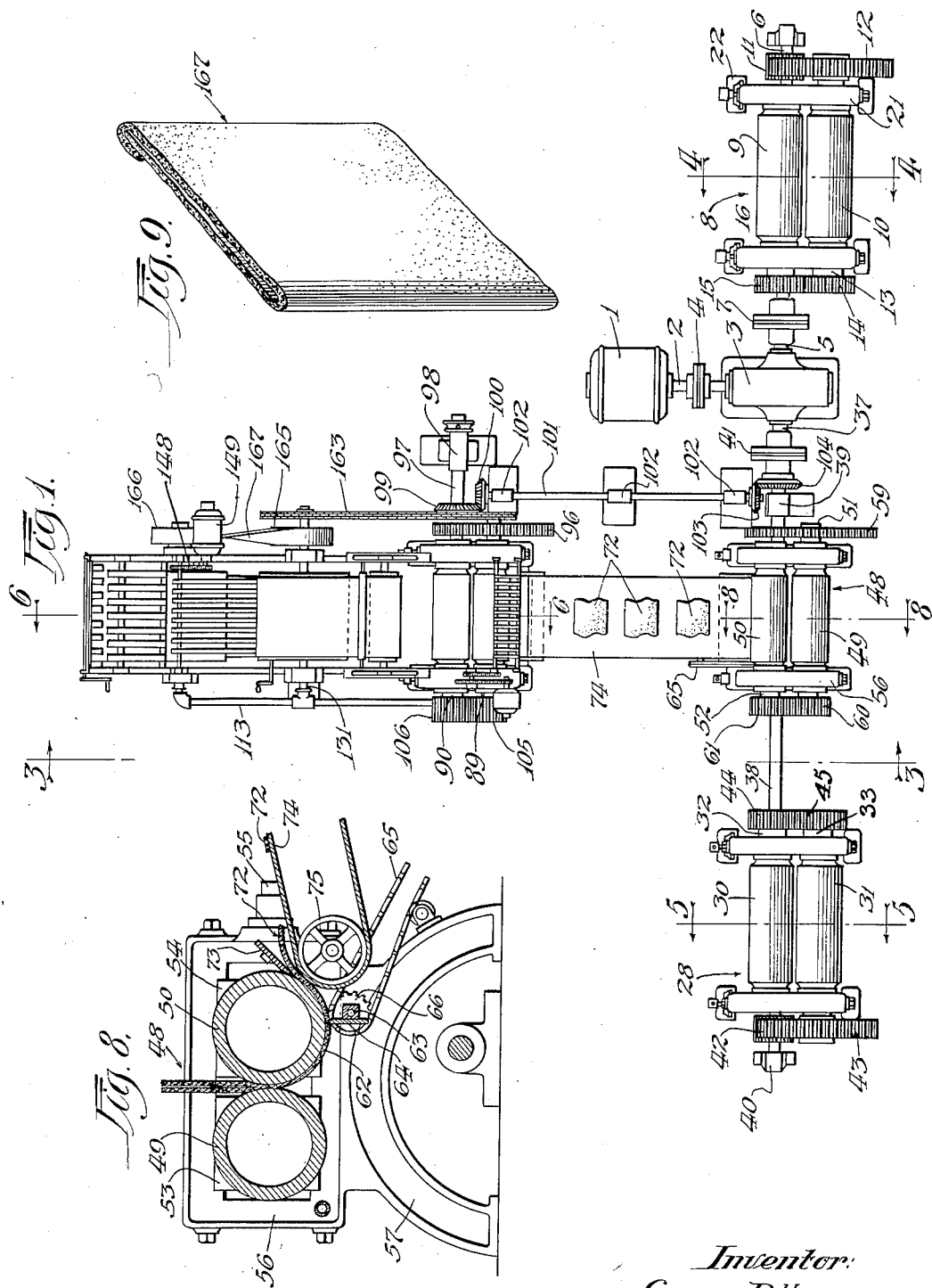

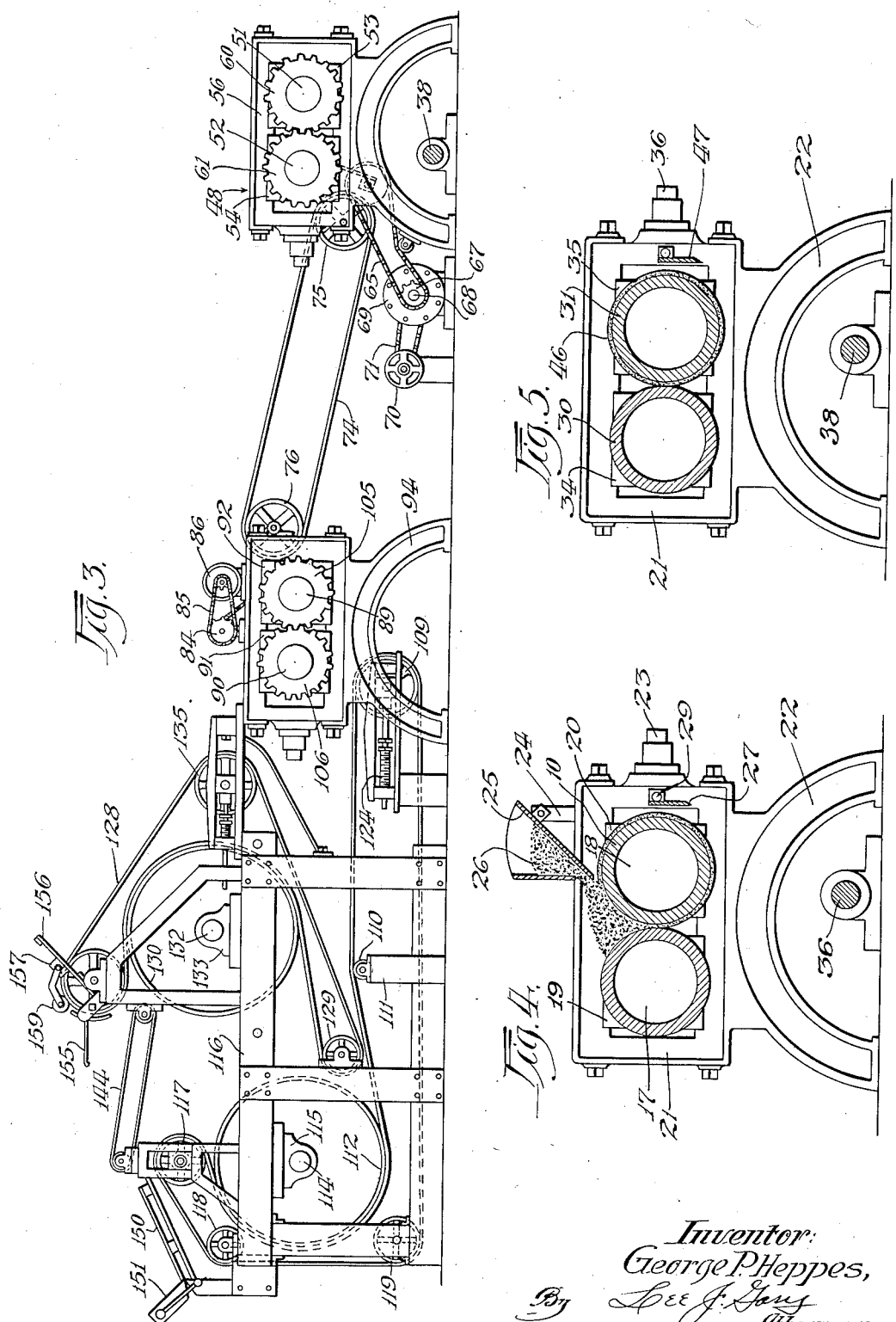

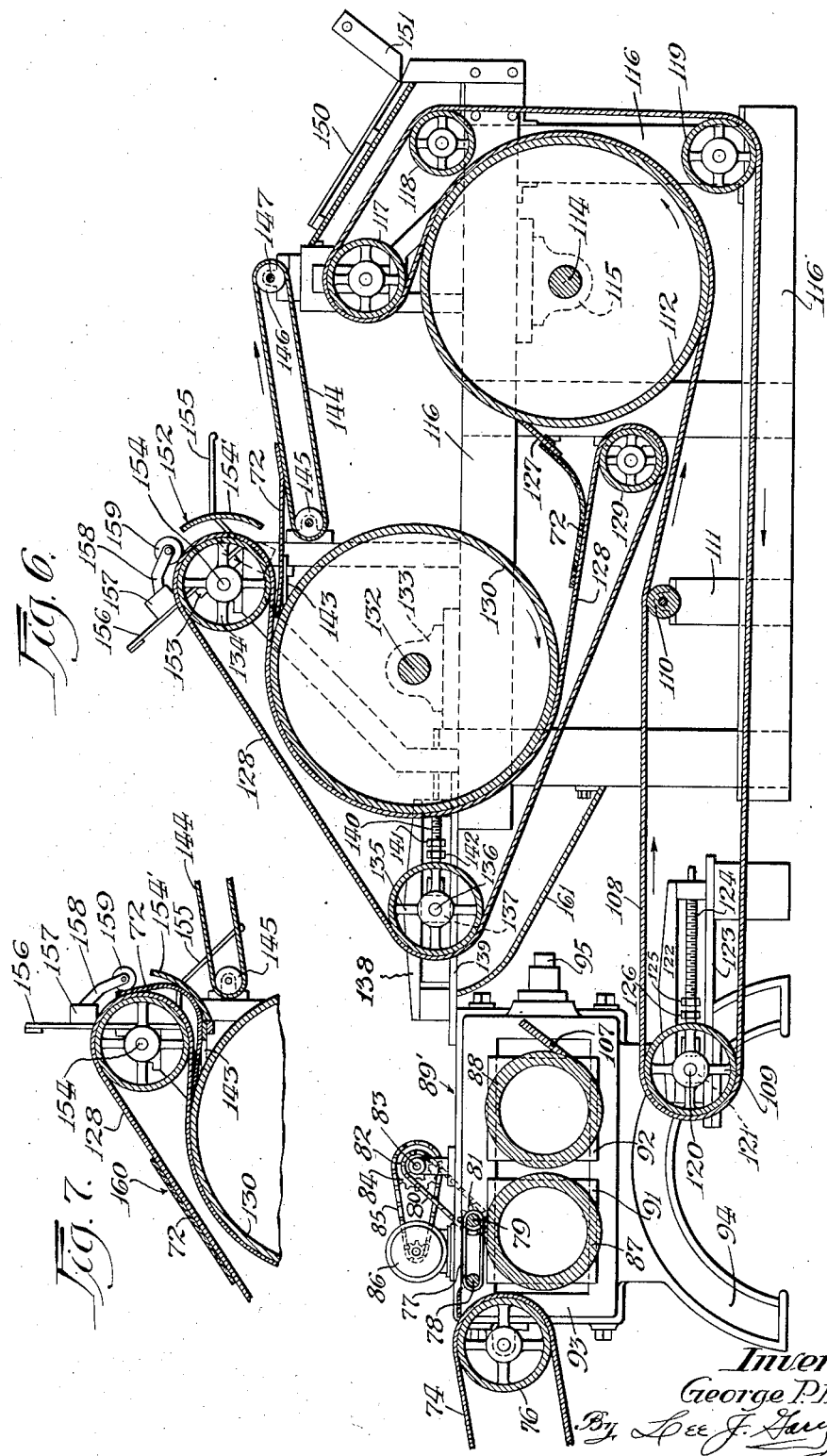

Patented Aug. 6, 1935

2,010,017

UNITED STATES PATENT OFFICE 2,010,017

MEANS FOR COOLING COMPOSITION TILE

George P. Heppes, Chicago Heights, Ill., assignor to The Tile-Tex Company, Chicago Heights, Ill., a corporation of Illinois Original application July 5, 1932, Serial No. 620,842. Divided and this application September 18, 1933, Serial No. 689,871

9 Claims. (Cl. 257—73)

This application is a division of my co-pending application, Serial No. 620,842, filed July 5, 1932, patented January 2, 1934, Patent No. 1,942,060.

This invention relates to improvements in a means for making composition tile and refers particularly to a means for cooling the heated pliable slabs, from which the tile is to be cut, to the desired temperature for cutting.

The utility, objects and advantages of my invention will be apparent from the accompanying drawings and following detail description.

In the drawings, Fig. 1 is a top plan view of a machine suitable for carrying out my invention.

Fig. 2 is a side elevational view illustrating particularly the drive.

Fig. 3 is an opposite side elevational view to that shown in Fig. 2.

Fig. 4 is a sectional view taken on the line 4—4 of Fig. 1.

Fig. 5 is a sectional view taken on the line 5—5 of Fig. 1.

Fig. 6 is a longitudinal sectional view taken on the line 6—6 of Fig. 1.

Fig. 7 is a detailed sectional view illustrating particularly the reversing mechanism of the cooling unit.

Fig. 8 is a sectional view taken on the line 8—8 of Fig. 1.

Fig. 9 is a detailed perspective view of a slab of material previous to its insertion in the first calendar unit.

Fig. 10 is a cross sectional view of a finished block of tile.

Referring in detail to the drawings, I indicates a motor which may be adapted to serve as the driving medium for my machine. It is to be understood, of course, that any prime mover may be utilized such as steam engine, internal combustion engine or the like. The motor shaft 2 may be coupled to a speed reducing unit 3 by means of coupling 4. Shaft 5 which is the low speed shaft of the speed reducer 3 may be coupled to shaft 6 by means of coupling 7, the shaft 6 being the drive shaft for the first mixing unit 8.

The mixing unit 8 may comprise a pair of co-acting rolls 9 and 10 being disposed adjacent each other, their axes being parallel. A pinion 11 may be mounted upon the drive shaft 6 and may be adapted to mesh with gear 12 which, in turn, may be mounted upon the shaft 13 of the roll 10. A gear 15 may be mounted upon shaft 16, the same shaft which carries the co-acting roll 9. The gear 15 may be of larger diameter than the gear 14 and consequently the roll 10 will revolve at a greater angular velocity than the roll 9, the ratio of the angular velocity of the rolls 10 and 9 may be approximately 3 to 2. However, I do not wish to be limited to this particular differential in angular velocity inasmuch as the same may be changed to meet various conditions of operation and variations in the material worked upon. The purpose of the differential in angular velocity will be hereinafter more fully described.

Both of the rolls 9 and 10 may be of hollow construction as shown best at 17 and 18 in Fig. 4, said rolls being adapted to be heated by steam introduced therein by means, not shown. This type of mixing unit wherein rolls are heated is well known to the art and it is believed that the showing of steam connections thereto is unnecessary. The rolls 9 and 10 may be supported respectively upon shafts 16 and 13 which may be journalled in the bearing blocks 19 and 20. The blocks 19 and 20 may be slidably positioned within the frames 21 mounted upon supports 22. Screws 23 may be threadedly mounted at the ends of frames 21 and may be connected to the bearing blocks 20, the arrangement being such that by rotation of the screws 23 the blocks 20 may be moved towards or away from the blocks 19. In this manner the clearance between the peripheries of the rolls 9 and 10 may be controlled.

The product of my invention, namely a flooring or wall composition tile may comprise a binder such as asphalt or gilsonite, a filler and a pigment. A representative mix may comprise approximately 26% of binder, 74% filler and a suitable quantity of pigment to obtain the desired color of the final product. Many types of fillers may be used such as asbestos or other materials having like characteristics. It is to be understood, of course, that the above proportions are given merely for purposes of illustration and are not intended to serve as a limitation upon my invention.

For purposes of illustration assume that gilsonite is used as the binder and that asbestos is used as the filler and that the materials are used in the approximate proportions suggested above. Lugs 24 may be mounted upon the frames 21 and may be adapted to support a hopper 25 which may be pivotally mounted upon said lugs. The asbestos and ground gilsonite may be introduced into the hopper 25 as shown at 26 in Fig. 4, the construction of the hopper being such as to direct the asbestos and gilsonite between the rolls 9 and 10. The temperature of the rolls 9 and 10 may be maintained as approximately 260° to 300° F., by means of the steam introduced therein. However, the fastest moving roll, namely roll 10 may be maintained at a lower temperature relative to the temperature of roll 9. The gilsonite upon contacting the hot rolls softens and the materials are formed into a more or less doughy mass which adheres to the surface of the more rapidly moving coolest roll 10. The doughy mass may be stripped from the roll 10 by means of the knife 27 which may be constructed of brass or other material having high heat conducting properties. The mass may be stripped from the roll 10, and it may if desired be reinserted between the rolls 9 and 10 and may be worked again and this procedure may be repeated until the consistency of the mass becomes uniform and the color thereof reaches the desired shade. The mass may then be stripped from the roll 10 and may be removed to the second mixing unit 28.

The stripping knife 27 may be pivotally mounted upon the frames 21 as shown best at 29 in Fig. 4 and as has been hereinbefore mentioned said stripping knife may be constructed of brass or other material having high heat conducting properties. I have found that if a material is used for the knife 27 which does not readily lose its heat, the doughy material being mixed between the rolls will adhere to the blade of the knife which will necessitate frequent cleaning of the knife. However, if a brass knife or a knife of the material having heat conducting properties similar to those of brass is used, the doughy mass will not adhere to the blade of the knife.

The second mixing unit may comprise rolls 30 and 31 mounted respectively upon shafts 32 and 33. The shafts 32 and 33 may be journalled respectively in bearing blocks 34 and 35 which may be adjustable towards or away from each other by means of screws 36. The frames for the support of the blocks 34 and 35 may be similar to the frame 21 of the mixing unit 8. Shaft 37 of the speed reducing mechanism 3 may be connected to shaft 38 supported by bearings 39 and 40, said connection being accomplished through the coupling 41. A pinion 42 may be mounted upon the shaft 38 and may be adapted to mesh with the gear 43 which, in turn, may be mounted upon shaft 33 and may be adapted to drive roll 31 directly. Gears 44 and 45 may be respectively mounted upon the shafts 32 and 33, the gears being of such dimensions as to rotate roll 31 at a greater angular velocity than roll 30.

The doughy mass is removed from the first mixing unit 3 in the form of a slab or sheet of relatively pliable material. Said material may then be inserted between the rolls 30 and 31 which are also of hollow construction and may be steam heated, roll 31 being maintained at a lower temperature than roll 30. As in the case of the rolls 9 and 10, the mass will adhere to the roll 31 as shown best at 46 in Fig. 5, which is revolving at a greater angular velocity and is cooler than the roll 30. Upon milling the material in the second mixing unit 28 the material may be further worked and the color may be brought to a more uniform state as will be hereinafter more fully described; trimmings from the press, which cuts the tile into the particular desired shapes, may be mixed with the doughy mass 46 during its working in the mixing unit 28. In this manner the waste may be utilized.

After working the material 46 in the mixing unit 28 until said material possesses uniform characteristics as to texture and color, the same may be stripped from the roll 31 by means of the knife 47 which may be pivotally mounted upon the frames 21 of the second mixing unit. The knife 47 is constructed of a material similar to the knife 27, namely, one possessing relatively high heat conducting properties.

The strip of material taken from the roll 31 of the second mixing unit may be folded in the form shown at 167 in Fig. 9 and is next passed through a calender unit 48. The unit 48 may comprise calender rolls 49 and 50 disposed adjacent each other and mounted respectively upon shafts 51 and 52, said shafts being journalled in bearing blocks 53 and 54, the blocks 54 being adjustable toward or away from the blocks 53 by means of screws 55. The blocks 53 and 54 may be slidably mounted within the frame 56 which, in turn, may be supported by the member 57, frame 56 and member 57 being similar in construction to the frames 21 and supports 22 of the mixing units 8 and 28.

A pinion (not shown) may be mounted upon the shaft 32 and is adapted to mesh with gear 59 mounted upon shaft 51. A gear 60 may also be mounted upon the shaft 51 at its opposite end and is adapted to mesh with gear 61 mounted upon shaft 52. As can readily be seen the roll 49 is driven by means of the gear 59 and due to the intermeshing relationship of the gears 60 and 61 which may be of equal diameters, the rolls 49 and 50 are driven at equal angular velocities.

As a feature of my invention I may heat the roll 50 by passing steam into the hollow interior thereof, said roll may be heated to a temperature of approximately 80 to 100° F., the roll 49 may be maintained as cold as possible by circulating water through the hollow interior thereof. At this stage the material adheres to the surface having the highest temperature and consequently the mixed dough-like strip taken from the mixer 28 when inserted between the calender rolls 49 and 50 adheres to the surface of the roll 50.

The axes of the rolls 49 and 50 may be so adjusted with respect to each other as to provide a clearance space between their respective adjacent surfaces equal to approximately a thickness 20% greater than the thickness of the final product, that is, the thickness of the tile. Of course, it is to be understood that the thickness of the strip 62 which adheres to the heated roll 50 will depend upon the characteristics of the material worked and consequently I do not wish to be limited to the above mentioned illustrative example.

A shaft 63 may be rotatably mounted between the frames 56 and may carry a cut-off knife 64 which may be of a length substantially equal to the length of the rolls 49 and 50. The shaft 63 may be rotated by means of sprocket chain 65 which may pass around sprocket wheel 66, said sprocket chain being in turn driven by the sprocket wheel 67 mounted upon shaft 68 of the variable speed reducing mechanism 69, which mechanism in turn may be driven by motor 70, said motor being connected to the mechanism 69 by means of sprocket chain 71. The shaft 63 may be driven at such a speed as to sever the material 62 adhering to the roll 50 into unit slabs 72, the length of said slabs being determined by the relative speeds of the roll 50 and the shaft 63. It can readily be seen that if unit slabs 72 of larger dimensions are desired, it is merely necessary to decrease the angular velocity of the shaft 63 while maintaining the rotation of the roll 50 constant.

In carrying out my invention the material may be passed through the machine proper in what may be termed a series-batch operation, that is, one mix introduced into the mixer 8 and subsequently operated upon in the finishing mixer 28 and passed to the calender unit 48, may supply sufficient material to produce a plurality of unit slabs 72. As will be hereinafter more fully described, the remaining operations performed upon said slabs are in the nature of continuous operations, each slab being operated upon in series.

Subsequent to the severing of the material 62 upon the roll 50, the unit slabs 72 formed by said cutting operation may be stripped from the surface of the roll 50 by means of the stripping knife 73 which may be of similar material and similar construction to the knives 27 and 47 upon the mixing units 8 and 28 respectively. After being stripped from the roll 50 the slabs may be carried forwardly and upwardly upon conveyor belt 74 which may be carried around pulleys 75 and 76.

The arrangement is such that the rate of travel of the conveyor belt 74 is materially greater than the peripheral speed of the roll 50 which results in the unit slabs 72 being positioned upon the conveyor 74 in spaced relationship as shown best in Fig. 1. As will be hereinafter more fully described, the unit slabs 72 are subsequently operated upon by a second calender unit in which operation the material is calendered and pressed to a thickness equal to the thickness of the final product. As has been hereinbefore described the first calender unit 48 may press the material 62 to a thickness in excess of the thickness of the final product, the suggested excess being substantially 20%. Consequently, when the slabs are subsequently pressed to the final thickness of the product, said slabs expand laterally and if the the spacing upon the belt was not sufficiently great to compensate for this expanding action, said slabs would enter the subsequent mechanism too close together. Consequently, in order to maintain desirable spacing of the unit slabs, the belt 74 may travel at a rate of speed in excess of the peripheral speed of the roll 50. As an example of this increased rate of speed the following may be suggested; for a 20% excess of thickness the belt 74 may be caused to travel at a rate of speed 50% greater than the peripheral speed of the roll 50. However, I do not wish to be limited to the above cited example in that the rate of speed of the belt in excess of the peripheral speed of the roll 50 will always be dependent upon the thickness of the unit slab 72 cut upon the roll 50 and also upon the desired spacing of the unit slabs from each other.

The unit slabs 72 carried upon the belt 74 are transferred when said belt passes around the pulley 76 to the conveyor belts 77 which may pass over pulleys 78 and 79, the pulleys 79 being rotated by means of sprocket chain 80 which may pass around sprocket wheel 81 mounted upon the shaft which carries the pulleys 79. The sprocket chain 80 is, in turn, driven by the sprocket wheel 82 mounted upon shaft 83. A second sprocket wheel 84 may be mounted upon shaft 83 and may be driven by sprocket chain 85 which, in turn, may be driven by the motor 86. In this manner the unit slabs delivered from the belt 74 are carried by the belts 77 to a point immediately above the rolls 87 and 88 of the second calender unit 89'.

The rolls 87 and 88 may be respectively mounted upon shafts 89 and 90 which may be journalled respectively in the bearing blocks 91 and 92, slidably mounted within the frames 93 which are supported by members 94. The blocks 92 may be adjusted towards or away from the blocks 91 by means of the screws 95. A gear 96 may be mounted upon the shaft 89 and may be driven by a pinion, not shown, which may be mounted upon shaft 97 journalled in bearings 98. A bevelled gear 99 may also be mounted upon the shaft 97 and may be adapted to mesh with bevelled gear 100 mounted upon shaft 101 which may be supported by bearings 102. The opposite end of shaft 101 may carry bevel gear 103 which may mesh with bevel gear 104 mounted upon shaft 38. In this manner it can be seen that the roll 49 is driven directly by the gear 96. A gear 105 may be mounted upon the opposite end of the shaft 89 and is adapted to mesh with gear 106 mounted upon the shaft 90. The gears 105 and 106 may be of equal diameters and consequently rolls 49 and 50 may be driven at equal angular velocity.

Similar to the first calender unit 48, one of the rolls, namely roll 87, may be cooled by the passage of water therethrough whereas the other roll 88 may be heated by passing steam therethrough and the unit slabs 72, carried by the belt 77 and delivered between the rolls 87 and 88, will adhere to the warmer roll 88. In passing between the rolls 87 and 88 as has been hereinbefore described, the slabs 72 are reduced in thickness and consequently all pock-marks and blemishes will be removed from the surfaces of the slabs. The slabs adhering to the surface of the roll 88 are stripped therefrom by means of knife 107 which may be of similar construction to the knife 73, said slabs being deposited upon the conveyor belt 108 which passes around pulley 109.

The unit slabs calendered in the second calender unit 89 and stripped from the roll 88 by the knife 107 are deposited upon the belt 108 and are carried forwardly by said belt, the slabs being disposed therein in spaced relationship with respect to each other and with respect to the direction of travel of the belt. The belt 108 may travel over guide roller 110 which may be mounted upon support 111 and after passage thereover said belt may be carried around a substantial portion of the area of the surface of cooling drum 112. The drum 112 may be of hollow construction and may be supplied with water or other cooling medium through the pipe 113 which may connect into the interior of said drum. Said drum may be mounted upon shaft 114 which may be journalled in bearings 115 mounted upon frame 116. The slabs carried by the belt 108 are confined between the belt and the surface of the cooling drum 112 during the passage of the belt over the surface of the drum. In this manner a substantial portion of the heat is removed from the slabs. In addition, by thus cooling one surface of each of the slabs, namely the surface in contact with the drum 112, the volatile matter or gases contained within the slab are driven away from the cooled surface toward the warmer surface which is in contact with the belt. Due to the cooling of one surface the material which comprises the slabs is densified adjacent that surface. In this manner volatile material contained within the slab is literally pressed or forced from the material adjacent the concave surface of the slab or the cooled surface thereof.

The warmer surface of the slab is adjacent the belt and said warmer surface also comprises the convex surface, hence the volatile material driven from the cooled surface of the slab can easily escape through the less dense material comprising the outer convex or warmer surface. By thus expelling the volatile material contained within the slab, subsequent blistering or the formation of air pockets is eliminated.

The belt 108 upon leaving the surface of the drum 112 is carried around pulleys 117, 118 and 119 and returns over pulley 109. The pulley 109 may be mounted upon shaft 120 which, in turn, may be journalled in bearing 121 slidably positioned between guides 122 and 123. The bearing 121 may be longitudinally moved between the guides 122 and 123 by means of the screw 124 which may be actuated by means of nut 125. By this arrangement the tension of the belt 108 may be adjusted and when the desirable adjustment has been made, the screw 124 may be locked by means of nut 126.

The slabs carried between the surface of the roll of the drum 112 on belt 108 are carried upon the surface of said drum after the belt 108 leaves the drum and passes around pulley 117. At a subsequent period of travel of the slabs upon the surface of the drum 112, said slabs are stripped from the surface of the drum by means of the stripping knife 127 mounted upon the frame 116. The slabs thus removed from the surface of the drum 112 are deposited upon the belt 128 which passes around pulley 129 immediately beneath the position of the stripping knife 127. The slabs 72 are so deposited upon the belt 128 that the cooled surface thereof is disposed adjacent the belt 128 and the warmer surface thereof faces upwardly. Upon forward motion of the belt 128 the same is carried around cooling drum 130 which may be constructed similarly to the drum 112, the drum 130 also having a hollow interior and being supplied with a cooling medium through the pipe 131. The drum 130 may be mounted upon shaft 132 which may be journalled in bearings 133 mounted upon the frame 116. The belt 128 is carried around the drum 130 and covers a substantial portion of the area of said drum. In passing over the surface of said drum the slabs 72 are confined between the belt and the drum. However, at this period, the cooled surfaces of the slabs are disposed adjacent the belt whereas the uncooled surfaces are maintained adjacent the cooling surface of the drum. In this manner the heat is removed from the warmer surface of the slab and the material adjacent thereto.

The belt 128 upon leaving the surface of the drum 130 is carried around pulleys 134 and 135 and returned over the pulley 129. The pulley 135 may be mounted upon shaft 136 which may be journalled in bearing 137 slidably positioned between the guides 138 and 139. The bearing 137 may be longitudinally moved between the guides 138 and 139 by means of screw 140, which may be actuated by nut 141 and locked by nut 142. By this arrangement the tension of the belt 128 may be adjusted.

At the point of travel where the belt 128 breaks contact with the surface of the drum 130, the slabs 72 carried between the belt and the drum are stripped from the surface of the drum by means of the stripping knife 143 which may be of similar construction to the knife 127. The slabs thus stripped from the surface of the drum 130 are carried forwardly to the conveyor belts 144 which travel around pulleys 145 and 146. The pulley 146 may be mounted upon shaft 147, said shaft also being adapted to carry a sprocket wheel, not shown, over which sprocket chain 148 travels, said sprocket chain also passing around a sprocket wheel, not shown, mounted upon the shaft of motor 149. In this manner the belts 144 are carried forwardly, carrying the slabs 72. At the end of the forward travel of the belts 144 the slabs 72 are delivered to the rack 150 which may be provided with stop 151. The slabs 72 thus delivered to the rack 150 may then be removed manually or mechanically to a suitable punch press, not shown, equipped with dies for cutting tiles of desired shapes and dimensions. A sectional view of one of the tiles is shown at 172 in Fig. 10.

If the slabs 72 are not brought to a suitable cutting temperature, difficulty will be encountered in cutting said slabs. If, for instance, the slabs are too warm, imperfect cuts will be made by the dies whereas if the slabs are too cold the cutting will result in chipped edges of the tiles and the lives of the cutting knives or dies of the press will be materially shortened. To bring the slabs to a desired cutting temperature, of course, will depend upon the thickness of the slabs and the rate of passage of the slabs through the cooling portion of the machine. For a given rate of passage through the machine and a predetermined temperature of the surfaces of the cooling drums which may be controlled within certain limits by controlling the passage of water or other cooling medium therethrough, a slab of thickness of approximately one eighth inch may be sufficiently cooled by one passage through the cooling portion of the machine. However, with other factors remaining constant, if the slabs are of greater thickness, one passage of the slabs through the cooling portion of the machine may not suffice to lower the temperature of the slabs to the desired degree for cutting. Consequently, I have provided a means and a method of returning the slabs, after their passage through the cooling portion of the machine, to the belt 108 whereby the slabs may be again carried through the cooling unit.

To accomplish this end I have provided a switching mechanism 152 which may comprise a member 153 which may be loosely journalled upon shaft 154, the same shaft which carries pulley 134. The member 153 may carry arcuate plate 154' provided with handle 155. The member 153 may also carry an extension 156 which, in turn, may support a counterweight 157 which may normally maintain the arcuate plate 154' in the position shown in Fig. 6. An arm 158 may be carried by the weight 157 and a roller 159 may be rotatably mounted upon the end of said arm, said roller being adapted to ride upon the surface of the belt 128 during its passage over the pulley 134.

To pass the slabs 72 through the cooling mechanism comprising the drums 112 and 130 but once, the switching mechanism 152 will be positioned as shown best in Fig. 6. If a greater degree of cooling is desired the member 153 may be rocked in a clockwise direction by means of handle 155 until the lower edge of the arcuate blade 154' lies beneath the surface of the stripping knife 143. It can readily be seen that as the slabs 72 are stripped from the surface of the roll 130, the forward edges of said slabs contact the concave face of the arcuate member 154 and are directed upwardly. Said forward edges in passing upwardly are inserted between the surface of the belt 128 and the roller 159 and are thus carried upon the surface of the belt as shown best at 160 in Fig. 7.

The slabs carried upon the upper surface of the belt 128 are delivered to a chute 161 mounted upon frame 116 when the belt 128 passes over the pulley 135. The chute 161 directs the slabs to the upper surface of the belt 108 previous to its passage around the first cooling drum 112. In this manner each of the slabs stripped from the drum 130 are carried around the pulley 134 upon the belt 128 and are deposited in series upon the belt 108 whereby said slabs may again be passed through the cooling unit. As has been hereinbefore described the slabs, depending upon their thickness, may be passed through the cooling unit once or any number of times sufficient to properly cool the material to a desired cutting temperature.

The size of unit batches which are made up or mixed in the mixing units 8 and 28, are so proportioned as to comprise a desired number of slabs which, if passed through the cooling unit more than once, will not be overlapped by the slabs being returned from the chute 161. That is, the first recycled slab delivered to the belt 108 from the chute 161 will be delivered to said belt following the passage of the last slab initially entering the cooling unit. If the slabs are to be delivered through the cooling unit but once, the batches mixed in the units 8 and 28 may be substantially larger. Of course, it is to be understood that if the slabs are to be passed through the cooling unit but once, the calendering and cooling units of the machine may be run continuously, that is, properly mixed material may be continuously forwarded to the first calender unit 48.

The driving mechanism for the cooling drums 112 and 130 may comprise a sprocket wheel 162 mounted upon shaft 89. Sprocket chain 163 may pass over the wheel 162 and may connect said wheel with sprocket wheel 164 mounted upon shaft 132. A pulley 165 may be mounted upon shaft 132 and may be operatively connected to pulley wheel 166 mounted upon shaft 114 by means of belt 167. The belt 167 may be crossed in order to impart reversed directions of rotation to the drums 130 and 112.

If desired, conventional circular slitting knives (not shown) may be mounted adjacent and operate in conjunction with calender roll 88 of the second calendar unit 89'. The knives may be adjusted to trim the edges of the slabs 72 or to sever each slab into two or more units. Of course, it is to be understood that the slitting knives may be eliminated since they comprise no part of my broad invention.

The making of slabs of composition material from which unit tiles may subsequently be cut has hereinbefore been described, the slabs being of one color. However, my invention broadly contemplates the making of slabs which may be subsequently cut into tile of desired dimensions with faces resembling marble, that is, in regard to the swirls or configurations which are characteristic of marble.

I claim as my invention:

1. In a machine of the character described the combination with means for conveying unit slabs, of a cooling zone comprising, moving cooling surfaces adapted to successively contact opposite faces of said slabs and means for returning said slabs for repassage through the cooling means.

2. In a machine of the character described the combination with means for conveying unit slabs, of a cooling zone comprising, a plurality of rotatable drums, means for cooling said drums, an endless belt carried upon a portion of the periphery of each drum, means for depositing the slabs from said conveying means upon the belt of the first drum, means for stripping the slabs from the first drum and depositing them on the belt carried by the second drum, and means adjacent the last drum for stripping the slabs therefrom and returning them to the belt of the first drum for repassage through the cooling zone.

3. In a machine of the character described the combination with means for conveying unit slabs, of a cooling zone comprising, a plurality of rotatable drums, means for cooling said drums, an endless belt carried upon a portion of the periphery of each drum, means for depositing the slabs from said conveying means upon the belt of the first drum, means for stripping the slabs from the first drum and depositing them on the belt carried by the second drum, means adjacent the last drum for stripping the slabs therefrom, and means adjacent said stripping means for redepositing said slabs upon the belt of the last drum whereby said slabs are deposited upon the belt of the first drum for repassage through the cooling zone.

4. In a machine of the character described the combination with means for conveying unit slabs, of a cooling zone comprising, a plurality of rotatable drums, means for cooling said drums, an endless belt carried upon a portion of the periphery of each drum, means for depositing the slabs from said conveying means upon the belt of the first drum, means for stripping the slabs from the first drum and depositing them on the belt carried by the second drum, means adjacent the last drum for stripping the slabs therefrom, and means adjacent the stripping means for deflecting the slabs into contact with the belt of the last drum comprising a curvilinear surface movable into and out of the path of travel of the slabs, whereby the slabs are deposited upon the belt of the last drum and reconveyed to the belt of the first drum for repassage in contact with the belt of the first drum.

5. In a machine of the character described the combination with means for conveying unit slabs of a cooling zone comprising, a pair of rotating cooling drums, an endless conveyor in contact with a portion of the periphery of one of said drums, means for depositing unit slabs from said conveying means upon said endless conveyor whereby said slabs are carried upon said drum beneath said endless conveyor, a second endless conveyor above said first endless conveyor in contact with a portion of the periphery of the second drum, means for removing said slabs from said first drum and depositing them in reverse position upon said second endless conveyor whereby the opposite faces of said slabs are brought into contact with said second drum beneath said second endless conveyor, means for removing said slabs from said second drum and depositing them upon said second endless conveyor whereby said slabs are dropped from said second endless conveyor to said first endless conveyor.

6. In a machine of the character described the combination with means for conveying unit slabs of a cooling zone comprising means for successively bringing opposite faces of said slabs into contact with a cooling surface.

7. In a machine of the character described the combination with means for conveying unit slabs, of a cooling zone comprising moving cooling surfaces adapted to successively contact opposite faces of said slabs.

8. In a machine of the character described the combination with means for conveying unit slabs, of a cooling zone comprising, a plurality of rotatable drums, means for cooling said drums, an endless belt carried upon a portion of the periphery of each drum, means for depositing the slabs from said conveying means upon the belt of the first drum, means for stripping the slabs from the first drum and depositing them on the belt carried by the second drum, and means adjacent the last drum for stripping the slabs therefrom.

9. In a machine of the character described the combination with means for conveying unit slabs of a cooling zone comprising, a pair of rotating cooling drums, an endless conveyor in contact with a portion of the periphery of one of said drums, means for depositing unit slabs from said conveying means upon said endless conveyor whereby said slabs are carried upon said drum beneath said endless conveyor, a second endless conveyor above said first endless conveyor in contact with a portion of the periphery of the second drum, means for removing said slabs from said first drum and depositing them in reverse position upon said second endless conveyor whereby the opposite faces of said slabs are brought into contact with said second drum beneath said second endless conveyor, and means for removing said slabs from said second drum.

GEORGE P. HEPPES.